United States Patent Office

3,164,714
Patented Jan. 5, 1965

3,164,714
WELDING APPARATUS
Allan Henry Barye Swan, Woking, Surrey, and Ivor Rowland Waller, Forrest Hall, Newcastle-upon-Tyne, England, assignors to The British Oxygen Company Limited
Filed Apr. 16, 1962, Ser. No. 187,488
12 Claims. (Cl. 219—126)

This invention relates to apparatus for use in welding the edges of substantially vertical plates to form a shell structure such as a cylindrical storage tank.

Known apparatus of this type comprises a carriage which is mounted on two wheels for movement in a direction parallel to the upper edge of the plates, and two frameworks depending from the carriage one at each side of the plates. The wheels may run on the upper edge of the plates or on a rail mounted parallel thereto. Automatic welding of the horizontal or vertical seam formed by the adjacent edges of two plates is effected by a welding head carried by one of the frameworks. In many instances welding heads are carried by both frameworks to enable welding from both sides of the plates. Various automatic welding processes may be used; for example the submerged arc process, the open arc process or the electro-slag process.

In order that the known apparatus may be used for welding shell structures of different curvatures, the wheels are pivotally mounted at fixed points on the carriage so that the wheels can be inclined about vertical axes to remain tangential to shell plates of different curvatures. This construction has the disadvantage that a relatively large adjustment of certain parts of the welding equipment has to be provided for in order that the welding nozzle can be retained at the required distance from the welding point and consequently the amount of working space available to an operator working on a platform in the outside framework during welding of a small tank may be considerably restricted. It is an object of the present invention to overcome this disadvantage.

According to the present invention there is provided apparatus for use in welding the edges of substantially vertical plates to form a curved shell structure comprising a carriage, two wheel mountings located forwardly and rearwardly of the carriage, two wheels mounted one in each mounting to enable the carriage to run along the upper edge of the plates or a track running parallel thereto, means for pivoting the wheels to align them tangentially to said upper edge or track at their point of contact, a first framework suspended from the carriage to support welding means for depositing weld metal at a welding point on the shell structure, and positioning means for adjusting the wheels transversely of the carriage to retain the welding means at a substantially constant distance from the welding point when welding shell structures of different curvature.

A second framework may be suspended from the carriage for location on the opposite side of the shell plates to the first framework in order that welding can be carried out, simultaneously on both sides of the shell plates; and in both cases the apparatus may be guided and stablised by roller means bearing against the sides of the plates.

These frameworks may be raised or lowered with respect to the carriage in order to facilitate the accurate positioning of the welding means on the joint to be welded.

The positioning means may comprise two arms mounted on the carriage to extend forwardly and rearwardly therefrom with each arm carrying a corresponding wheel mounting; and the means for pivoting the wheels may comprise a pivotal connection between each wheel mounting and its corresponding arm. Each arm may be pivotally mounted on the carriage to facilitate the transverse adjustment of the wheels, and these pivotal mountings of the arms may be collinear with a central point on the carriage which remains approximately vertically above the welding point. A third wheel may be mounted, on the carriage at this central point to run along said upper edge or track, and this third wheel may be coupled to drive means whereby the apparatus can be driven along said upper edge or track.

Two embodiments of the present invention will now be described by way of example with respect to the accompanying drawings in which.

Figure 1:
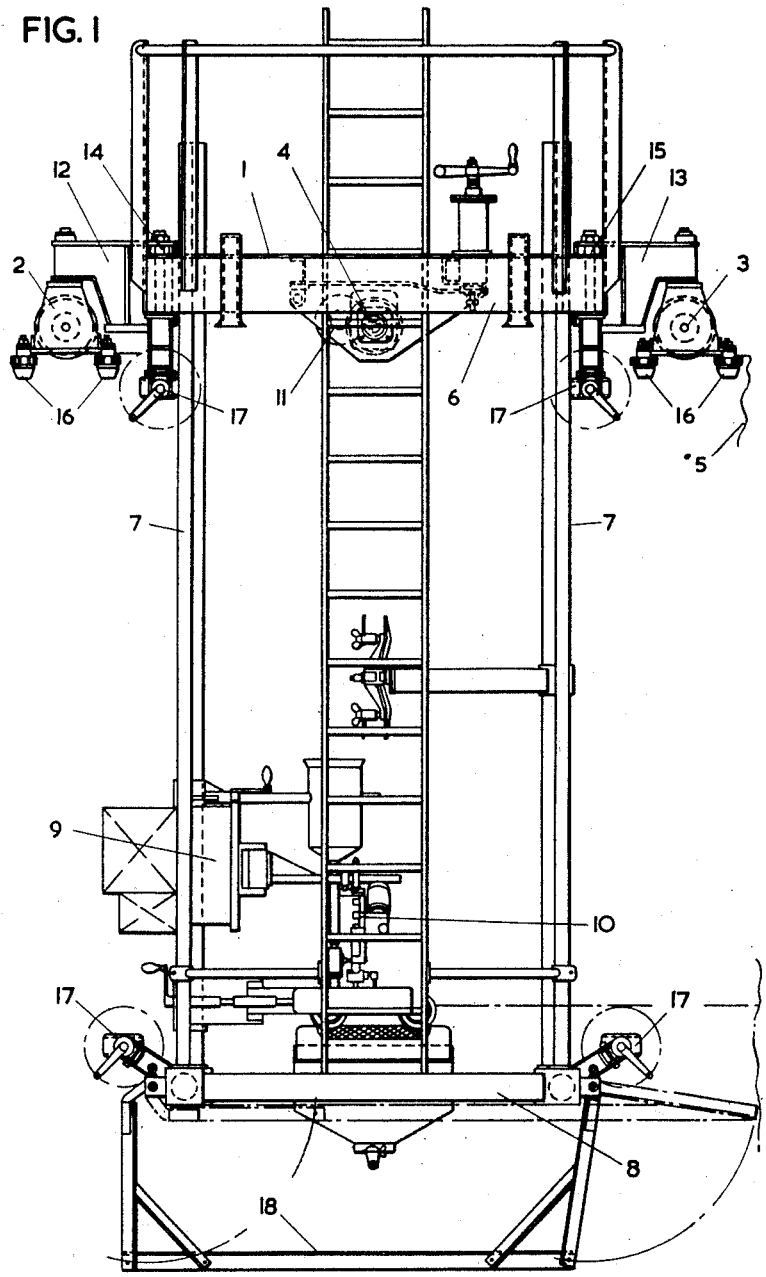
FIGURE 1 is a side elevation of a first electric arc welding apparatus.
Figure 2:
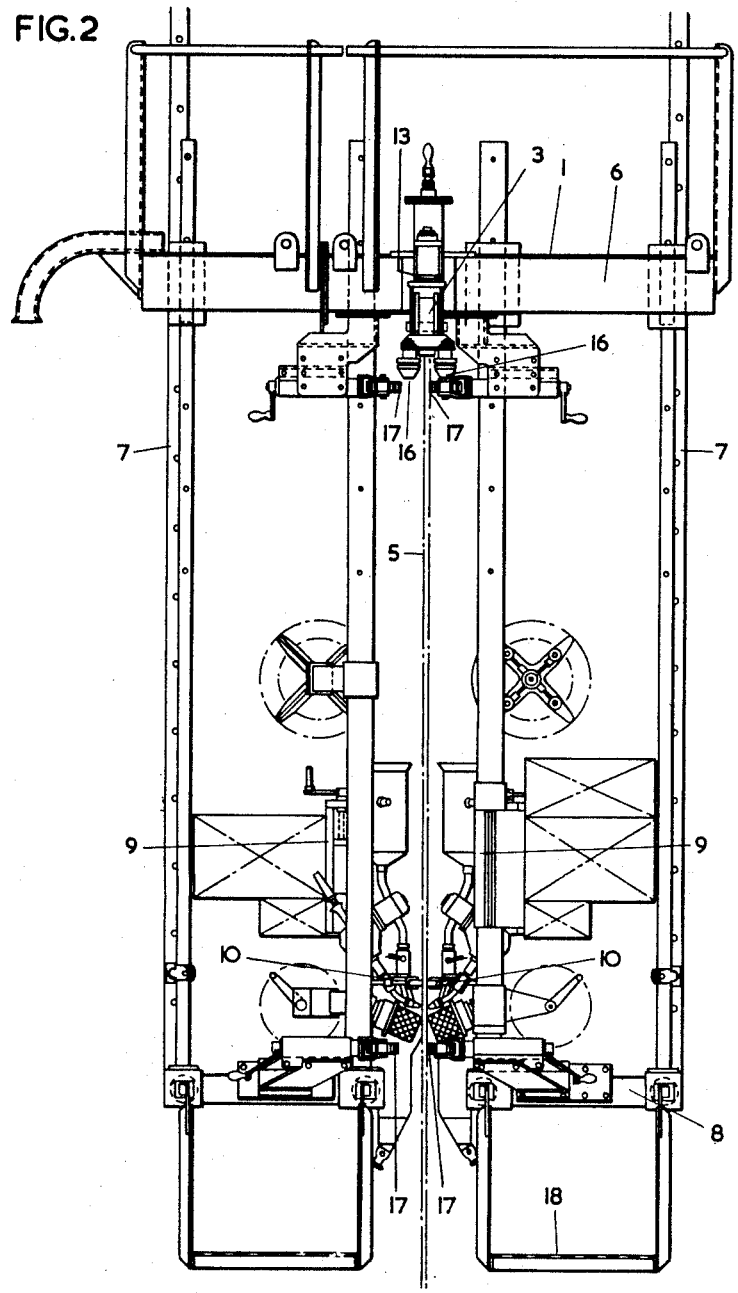
FIGURE 2 is a front elevation of the apparatus illustrated in FIGURE 1.

Referring to FIGURES 1 and 2, the first embodiment includes a carriage 1 which is mounted on three wheels 2, 3 and 4 for travelling along the upper edge of the plates 5 being welded. A platform structure 6, extends transversely of the carriage 1 and is provided with sockets through which extend eight vertical pillars 7. Four of these pillars, together with cross-members 8 joining their lower ends, form a framework, and the arrangement is such that a framework depends from the carriage 1 at each side of the plates 5 being welded, with a mounting 9 for an automatic welding head 10 being provided on one or on both frameworks. The pillars 7 can be raised or lowered relatively to the platform 6, and then clamped in position to suit the width of the plate being welded.

Of the three wheels on which the carriage 1 is mounted, the leading and trailing wheels 2 and 3 are idler wheels and the central wheel 4 is driven by an electric motor 11 to move the carriage at welding speed along the upper edge of the plates. This central wheel 4 is normally spring loaded against the upper edge of the plates but can be lifted clear to permit manual positioning of the apparatus. To maintain the central wheel at a point approximately above the welding point when the apparatus is used on plates of differing curvature, the leading and trailing wheels 2 and 3 are adapted to be moved laterally of the carriage 1 when plates of smaller or larger diameter are to be welded. For this purpose the leading and trailing wheels are pivotally mounted on arms 12 and 13 respectively which are themselves pivotally mounted on the carriage. This particular apparatus can be used to weld a horizontal seam on a vertically disposed flat plate, and the three wheels 2, 3 and 4 then run on the straight upper edge of the plate. The pivotal mountings 14 and 15 on the carriage for the arms are disposed at equal distances on opposite sides of the central wheel; and the arms are of equal length. The axles of the leading and trailing wheels are each carried by side plates which are flanged to support small rollers 16 rotating about vertical axes and bearing against the sides of the plate adjacent the upper edge, these small rollers 16 acting to stabilise the apparatus. When the apparatus is to be used on a curved plate the arms 12 and 13 are swung out laterally about the vertical axes of their pivotal mountings on the carriage until the leading and trailing wheels are above the upper edge of the plate, and these wheels are then inclined about the vertical axes of their own pivotal mountings on the arms until they are approximately tangential to the upper edge of the plate. The positioning and movement of the apparatus on the plates is facilitated by guide rollers 17 which are rotatable about vertical axes and are adjustably mounted to contact the plates. Two of these guide rollers are mounted at the top of each side of the plates on brackets attached to the carriage, and two lower guide rollers are mounted at each side on the cross-members of the frameworks to engage the plate below the horizontal seam being welded.

As a result of maintaining the central wheel 4 above the welding point for plates of differing curvature there is little lateral shift of the central parts of the frameworks with respect to these plates and consequently only small adjustments, if any, of the welding head on its mounting are therefore required. This is in contrast to the known apparatus where it has been necessary to adjust through a considerable distance at least the nozzle through which the welding electrode is directed to the weld seam.

An operator's platform 18 is secured to the cross members 8 to extend below one or both of the frameworks and from this platform 18 an operator can supervise the welding operation, and if necessary, deposit weld metal manually at the welding point. In some instances the operator may deposit weld metal from a semi-automatic welding gun. Auxiliary welding equipment, such as spools of welding wire, a wire feeder device, gas cylinders, flux supports and a flux hopper are carried on the platform or on the framework in conventional manner.

Figure 3:
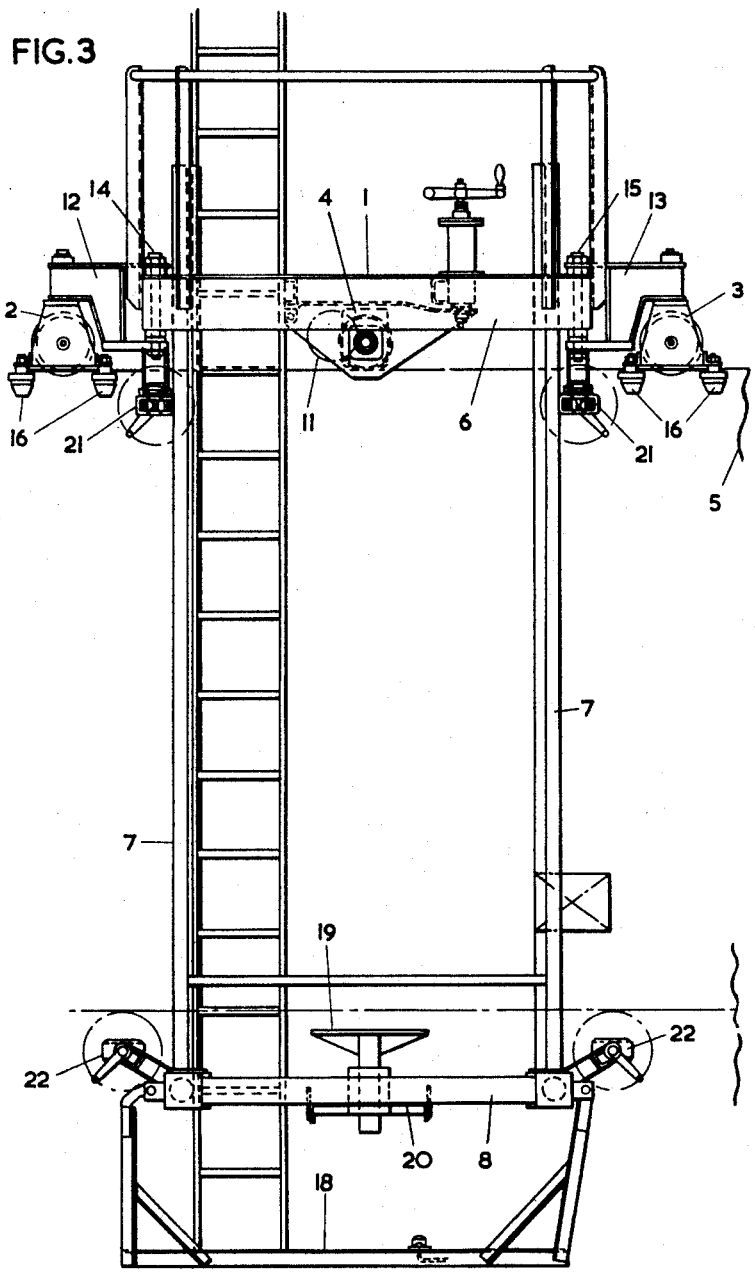
FIGURE 3 is a side elevation of a second electric arc welding apparatus.
Figure 4:
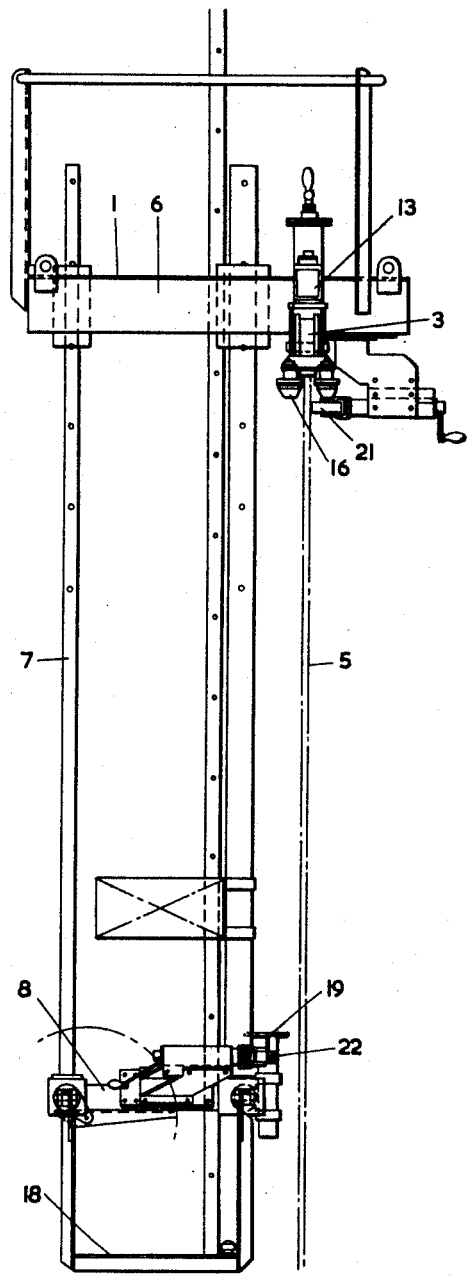
FIGURE 4 is a front elevation of the apparatus illustrated in FIGURE 3.

Referring to FIGURES 3 and 4, the second embodiment of the present invention is basically similar to the first embodiment except that it only has one framework suspended from the carriage at one side of the plates being welded; and in order to simplify the description corresponding similar features of the two embodiments have been given the same reference numerals. A vertically adjustable support 19 for a welding torch or gun is provided on the framework at a slightly higher level than a seat 20 for a welding operator.

The platform 6 may be formed with releasable connecting means to permit a further platform section to be coupled thereto with necessary, this further platform section having four sockets to receive the four pillars of a similar framework adapted to extend at the other side of the plates being welded.

The positioning and movement of the apparatus on the plates is facilitated by guide rollers which are rotatable about vertical axes and adjustably mounted to contact the plates. Two of these guide rollers 21 are mounted at the top of the plates on brackets attached to the side of the carriage opposite to the framework, and two lower guide rollers 22 are mounted at the other side on the cross member of the framework to engage the plate below the horizontal seam being welded.

What we claim is:

1. Apparatus for use in welding the edges of substantially vertical plates to form a curved shell structure comprising a carriage, two wheel mountings located forwardly and rearwardly of the carriage, two wheels mounted one in each mounting to enable the carriage to run along the upper edge of the plates or a track running parallel thereto, means for pivoting the wheels to align them tangentially to said upper edge or track at their point of contact, a first framework suspended from the carriage to support welding means for depositing weld metal at a welding point on the shell structure, and positioning means for adjusting the wheels transversely of the carriage to retain the welding means at a substantially constant distance from the welding point when welding shell structures of different curvature, said positioning means comprising two arms mounted on the carriage to extend forwardly and rearwardly therefrom, each arm carrying one of said corresponding wheel mountings.

2. Apparatus according to claim 1 in which said positioning means comprises two arms adjustably mounted on the carriage to extend forwardly and rearwardly therefrom; and in which each arm carries one of said corresponding wheel mountings.

3. Apparatus according to claim 1 in which said means for pivoting the wheels comprises a pivotal connection between each wheel mounting and its corresponding arm.

4. Apparatus according to claim 1 in which each arm is pivotally mounted on the carriage.

5. Apparatus according to claim 4 in which the arms are mounted on the carriage at points which are collinear with a central point on the carriage which remains approximately vertically above the welding point during operation.

6. Apparatus according to claim 5 in which a third wheel is mounted on the carriage at said central point to travel along said upper edge or track.

7. Apparatus according to claim 6 in which said third wheel is coupled to drive means whereby the apparatus can be propelled along said upper edge or track.

8. Apparatus according to claim 1 in which the framework can be raised or lowered with respect to the carriage.

9. Apparatus according to claim 1 further comprising two sets of guide rollers having rollers which are rotatable to make rolling contact with the plates with one set above the welding point on the opposite side of the plates to the welding means, and the other set below the welding point on the same side of the plates as the welding means.

10. Apparatus according to claim 1 further comprising a second framework suspended from the carriage for location on the opposite side of the plates to the first framework.

11. Apparatus according to claim 10 further comprising two sets of guide rollers to be located on opposite sides of the plates to make rolling contact with the plates in which each set comprises at least two rollers one above and one below the welding point.

12. Apparatus according to claim 1 further comprising stabilizing rollers rotatable about vertical axes to bear against both sides of the plates near to their upper edge.

References Cited by the Examiner

UNITED STATES PATENTS 2,781,441  2/57  Ballentine et al. -------- 219—126
2,916,605  12/59  Lucas ---------------- 219—126

RICHARD M. WOOD, *Primary Examiner.*